United States Patent [19]

Streed

[11] 4,261,599
[45] Apr. 14, 1981

[54] JOINT FOR CONNECTING PIPES

[75] Inventor: William R. Streed, St. Simons Island, Ga.

[73] Assignee: Koch Fiberglass Products Co., Wichita, Kans.

[21] Appl. No.: 950,561

[22] Filed: Oct. 12, 1978

[51] Int. Cl.³ .............. F16L 19/03; F16L 25/00; F16L 35/00; F16L 37/10

[52] U.S. Cl. .............................. 285/81; 285/92; 285/362; 285/423; 403/320

[58] Field of Search .............. 285/362, 358, 359, 377, 285/91, 92, 423, 313, 309, 81, 82, 84–86, 332.3; 403/320, 316; 151/8, 23

[56] References Cited

U.S. PATENT DOCUMENTS

| | | | |
|---|---|---|---|
| 593,190 | 11/1897 | Bernhardt | 285/332.3 X |
| 1,086,517 | 2/1914 | Eckman | 151/29 |
| 1,761,352 | 6/1930 | Logan | 285/86 |
| 1,997,858 | 4/1935 | Clawson | 285/362 |
| 2,318,590 | 5/1943 | Boynton | 285/81 |
| 2,933,428 | 4/1960 | Mueller | 285/423 X |
| 3,203,714 | 8/1965 | Cronk, Jr. | 285/359 X |
| 3,622,185 | 11/1971 | Rosan, Sr. et al. | 403/316 |
| 3,995,889 | 12/1976 | Carr et al. | 285/91 |
| 4,014,568 | 3/1977 | Carter et al. | 285/423 X |
| 4,076,285 | 2/1978 | Martinez | 285/423 X |
| 4,141,574 | 2/1979 | Stansifer et al. | 285/91 X |

FOREIGN PATENT DOCUMENTS

| | | | |
|---|---|---|---|
| 507008 | 9/1930 | Fed. Rep. of Germany | 285/81 |
| 949314 | 9/1956 | Fed. Rep. of Germany | 285/358 |
| 185244 | of 1887 | France | 285/358 |
| 385508 | 3/1908 | France | 285/332.3 |
| 505486 | 5/1920 | France | 151/8 |
| 1386550 | 12/1963 | France | 285/377 |
| 431700 | 7/1935 | United Kingdom | 285/359 |

*Primary Examiner*—Roy D. Frazier
*Assistant Examiner*—Carl F. Pietruszka
*Attorney, Agent, or Firm*—Woodford R. Thompson, Jr.

[57] ABSTRACT

A joint for connecting pipes embodying a first sleeve surrounding and bonded to the end of a first pipe and a bell surrounding and bonded to the end of a second pipe. The bell has an enlarged diameter bore terminating in an annular shoulder at its inner end with the bore being of a size to receive the first sleeve with the inner end of the first sleeve being movable to a position adjacent the shoulder. A second sleeve surrounds the first pipe adjacent the first sleeve within the bell and is adapted for rotative and axial movement relative to the first pipe. Cams within the bell cooperate with cams on the second sleeve to effect axial movement of the second sleeve in response to rotative movement of the second sleeve. Sealing means between the shoulder and the inner end of the first sleeve effects a seal therebetween upon axial movement of the first sleeve to a position with its inner end adjacent the shoulder.

1 Claim, 14 Drawing Figures

JOINT FOR CONNECTING PIPES

BACKGROUND OF THE INVENTION

This invention relates to a joint for connecting pipes and more particularly to a joint which is especially adapted for connecting plastic pipe sections to each other in a minimum of time to provide an effective sealed joint therebetween.

Heretofore in the art to which my invention relates, difficulties have been encountered in assemblying plastic pipe sections due to the fact that such pipe sections are usually assembled under adverse conditions in the field and also such pipes often convey abrasive materials which not only prevent rotation of the parts to be assembled relative to each other but also cut or damage the sealing gaskets or rings whereby an effective seal cannot be made. That is, plastic pipes are often employed in fly ash sluice lines, sour crude oil gathering lines and the like wherein fly ash, sand and other highly abrasive materials flow through the pipe. Also, in plastic lines which convey highly abrasive materials, such as fly ash, it is often necessary to rotate such lines periodically to prevent the bottom from eroding away due to friction resulting from movement of the fly ash against the bottom. With prior art joints it is very difficult and often impossible to rotate the pipe after assembly due to the fact that the O-ring surrounds and receives the adjacent component of the joint. In many cases the O-ring must be expanded as the adjacent component is forced therethrough whereby the O-ring is compressed. Difficulties have also been encountered with prior art joints for plastic pipe sections due to the fact that most joints for such pipe sections leave an annular space between the connected joint sections which brings about turbulence and cavitation which reduces the life of the joint. Such a joint is disclosed in the Carter U.S. Pat. No. 3,784,239. Also, some prior art pipe joints are provided with flanges which requires the installation of a plurality of bolts, thus greatly increasing the cost of the joint as well as increasing the time required to install the joint. Such a joint is disclosed in the Milette Pat. No. 3,197,242. Furthermore, prior art pipe joints which are not retained in place by a flange and bolt-like assembly often become loose after they have been in use for a period of time due to vibrations which cause the components of the joint to rotate relative to each other.

SUMMARY OF THE INVENTION

In accordance with my invention, I provide a joint for connecting pipes which not only provides a better seal between the connected pipe sections but also permits rotation of the pipe sections after assembly and is adapted for use under various pressures without damage to the sealing means therefor. My improved joint comprises a first sleeve surrounding and bonded to the end of a first pipe section and a bell-like member surrounding and bonded to the end of a second pipe section. An enlarged diameter bore is provided in the bell-like member which terminates in an annular shoulder with the bore being of a size to receive the first sleeve-like member with the inner end thereof being movable to a position adjacent the shoulder. A second sleeve surrounds the first pipe section adjacent the first sleeve within the bell and is adapted for rotative and axial movement relative to the first pipe section. Inwardly projecting cam means is provided in the bell-like member in position to cooperate with outwardly projecting cam means on the second sleeve-like member to effect axial movement of the second sleeve in response to rotative movement of the second sleeve. Annular sealing means is provided between the inner end of the first sleeve and the shoulder to effect a seal therebetween upon axial movement of the first sleeve to a position with its inner end adjacent the shoulder.

DESCRIPTION OF THE DRAWINGS

Joints for connecting pipes embodying features of my invention are illustrated in the accompanying drawings, forming a part of this application, in which.

Figure 2:
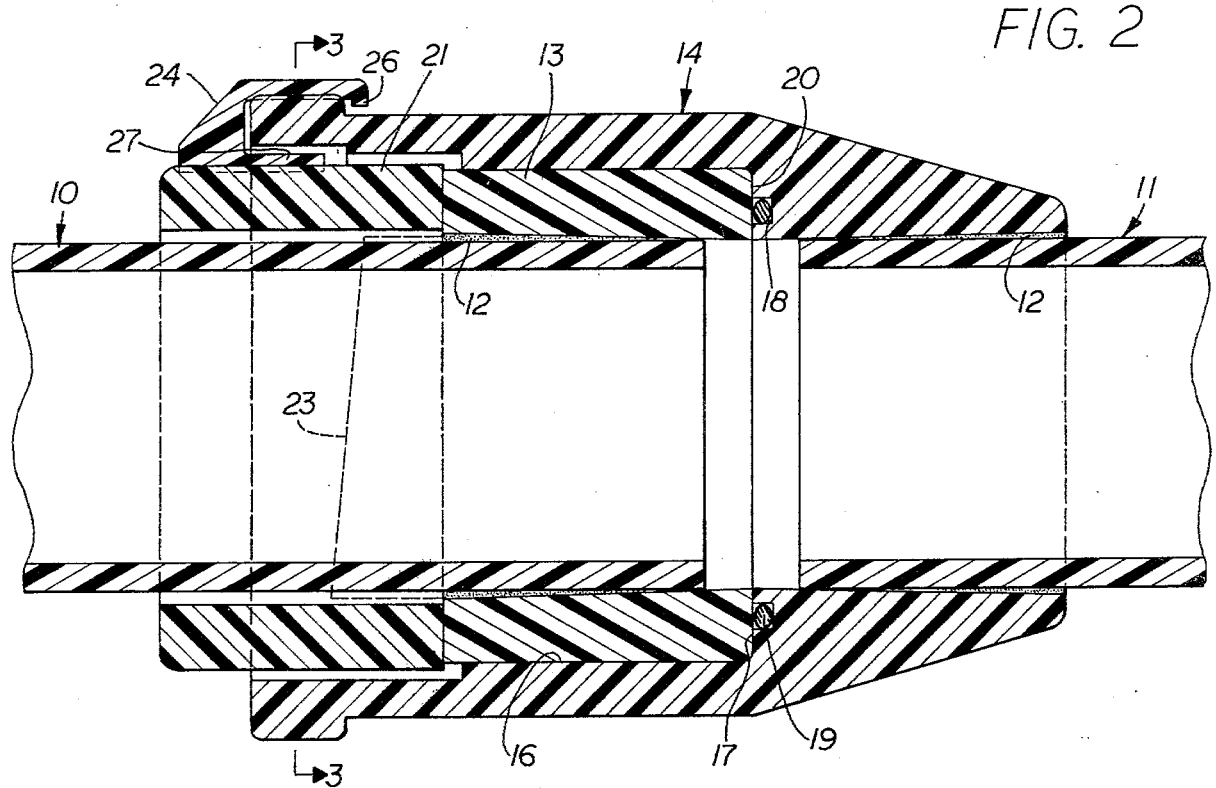
FIG. 2 is a sectional view taken generally along the line 2—2 of FIG. 3.

Referring now to the drawings for a better understanding of my invention, I show in FIGS. 1-8 one form of my improved joint for connecting a first pipe section 10 to a second pipe section 11. Surrounding and bonded to the end of the pipe section 10 by a suitable adhesive 12 is a sleeve 13. A bell-like member 14 surrounds and is bonded to the end of the pipe section 11 by the adhesive 12, as shown. Preferably, the pipe sections 10 and 11 and the components of my improved joint are formed of conventional plastic materials. Since such plastic pipes and the adhesive employed to bond one component to another are well known in the art to which my invention relates, no further description thereof is deemed necessary.

The bell-like member 14 is provided with an enlarged diameter bore 16 which terminates in an annular shoulder 17 at its inner end, as shown in FIG. 2. The bore 16 is of a size to receive the sleeve 13 with the inner end of the sleeve 13 being movable to a position adjacent the annular shoulder 17. In the embodiment shown in FIGS. 1-8, the annular shoulder 17 at the inner end of the bore 16 is shown as extending generally perpendicular to the axial center of the bore 16. As shown in FIG. 2, an internal annular groove 18 is provided in the annular shoulder 17 for receiving a sealing ring 19, which may be a conventional O-ring. The sealing ring 19 is thus adapted to engage the inner end 20 of the sleeve 13 upon movement of the sleeve 13 to the position shown in FIG. 2 to thus provide an effective seal between the inner end of the sleeve 13 and the shoulder 17.

A sleeve 21 surrounds the pipe section 10 adjacent and outwardly of the sleeve 13 and is adapted for rotative and axial movement within the bell-like member 14 to selected positions relative to the pipe section 10. As shown in FIGS. 1, 3, 4 and 5, inwardly projecting cam members 22 are formed integrally with the inner surface of the bell-like member 14 and are cooperable with outwardly projecting cam members 23 carried by the sleeve 21 to effect axial movement of the sleeve 21 in response to rotative movement of the sleeve 21. As shown in the drawings, the cam members 22 and 23 are in the form of arcuate cam shoulders which extend helically between the bell-like member 14 and the sleeve 21 for approximately 90°. Accordingly, to assemble or disassemble the joint, the sleeve 21 is rotated only 90° relative to the bell-like member 14.

Figure 1:
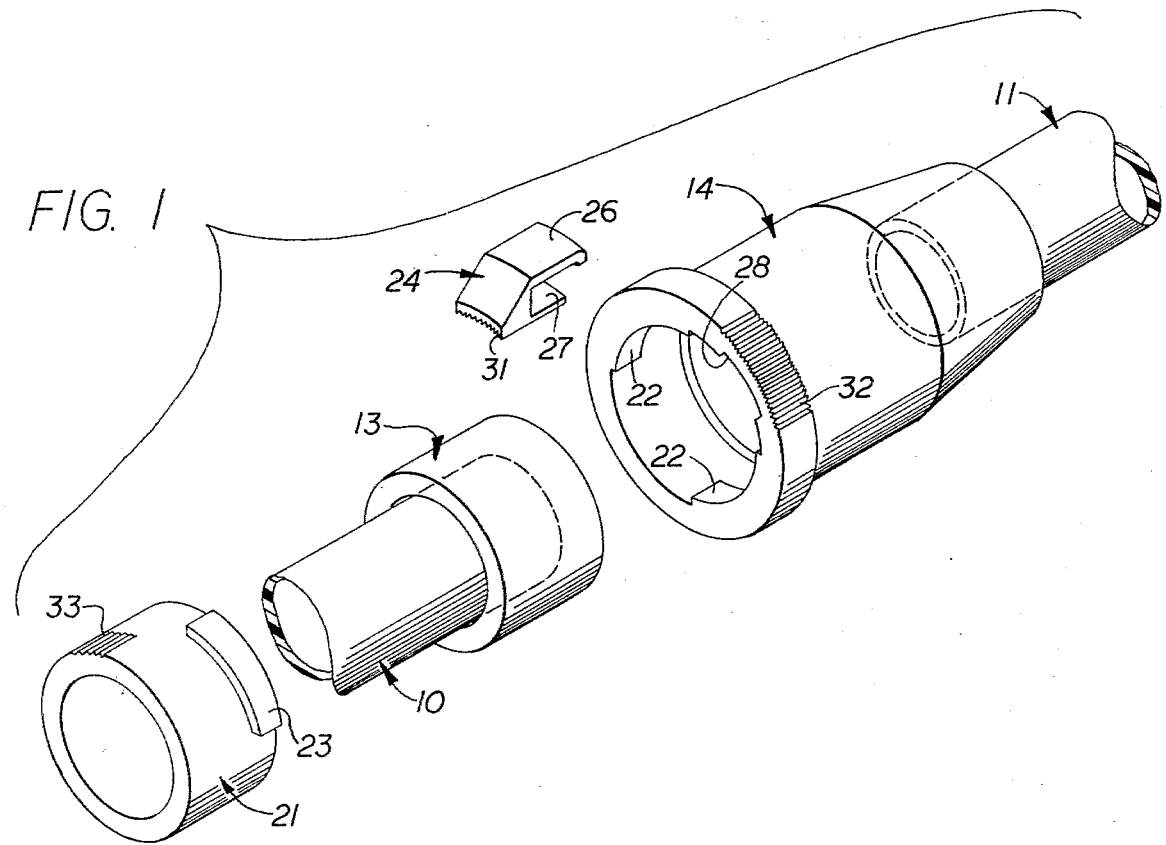
FIG. 1 is an exploded perspective view.
Figure 3:
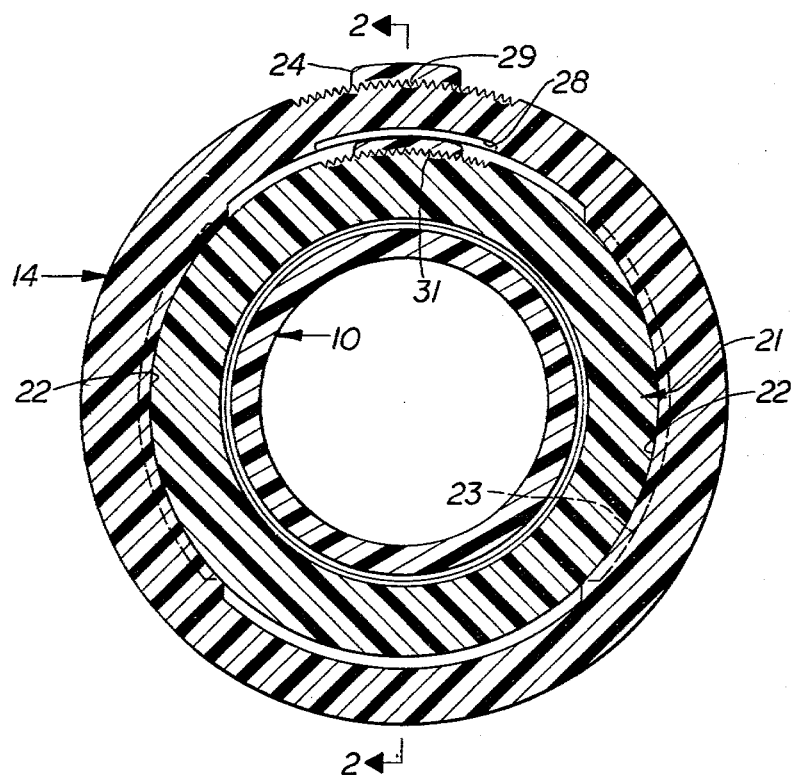
FIG. 3 is a sectional view taken generally along the line 3—3 of FIG. 2.
Figure 4:
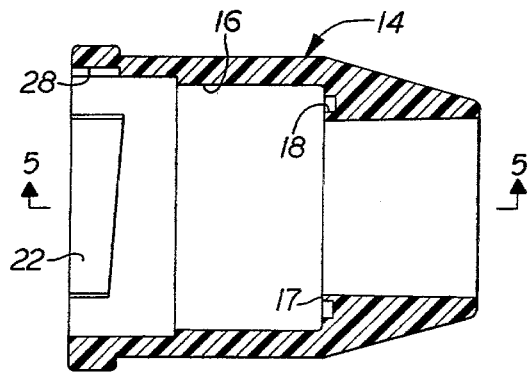
FIG. 4 is a sectional view corresponding to FIG. 2, drawn to a smaller scale, showing only the bell-like member with the remainder of the joint being omitted for the sake of clarity.
Figure 5:
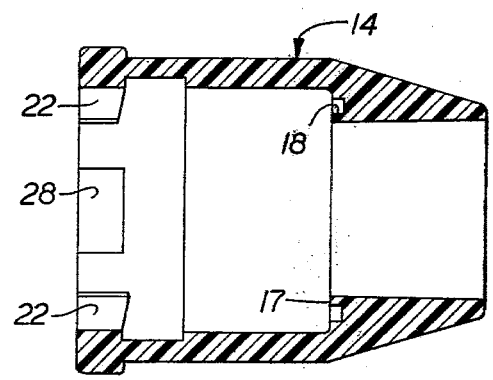
FIG. 5 is a sectional view taken generally along the line 5—5 of FIG. 4.
Figures 6, 7, 8:
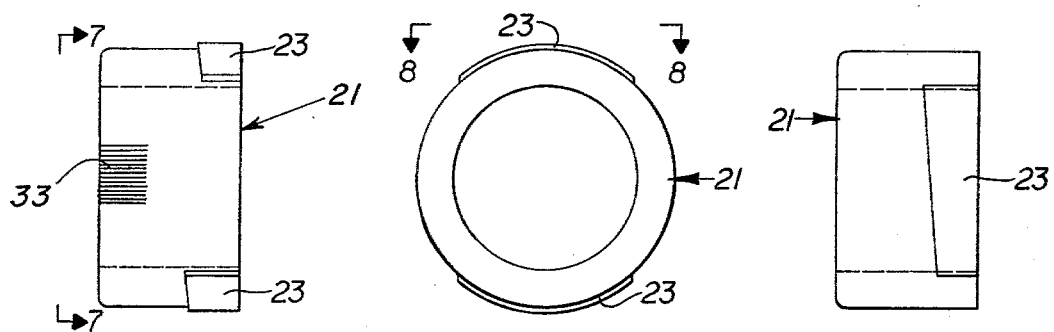
FIG. 6 is a side elevational view showing the rotatable sleeve having cam means thereon.
FIG. 7 is an end elevational view taken along the line 7—7 of FIG. 6.
FIG. 8 is a side elevational view taken along the line 8—8 of FIG. 7.

To prevent relative movement between the sleeve 21 and the bell-like member 14, after assembly of the joint, I provide a locking member 24 which detachably connects the bell-like member 14 to the sleeve 21. The locking member 24 is shown as comprising a generally U-shaped bracket having an upper leg 26 and a lower leg 27. The upper leg 26 is adapted to snap over and engage a segment of the outer surface of the bell-like member 14 while the lower leg 27 extends between the inner surface of the bell-like member and a segment of the outer surface of the sleeve 21. As shown in the drawings, a recess 28 is provided in the inner surface of the bell-like member 14 for receiving the lower leg 27 of the locking member 24. As shown in FIGS. 1, 3 and 6, longitudinally extending serrations 29 and 31 are provided in the under surfaces of the legs 26 and 27, respectively, in position to cooperate with longitudinally extending serrations 32 and 33 carried by the adjacent outer surfaces of the bell-like member 14 and the sleeve 21, respectively.

From the foregoing description, the assembly of my improved pipe joint shown in FIGS. 1–8 will be readily understood. The sleeves 21 and 13 are slipped over the end of the pipe section 10 and the sleeve 13 is bonded to the outer surface of the pipe section 10 by the adhesive 12. The pipe section 11 is inserted into the reduced diameter portion of the bore through the bell-like member 14 to the position shown in FIG. 2 and is secured in place by the adhesive 12. The O-ring 19 is inserted into the annular groove 18 whereby it is in position to engage the inner end 20 of the sleeve 13 upon axial movement of the sleeve 13 to a position adjacent the annular shoulder 17. The sleeves 13 and 21 are inserted into the bell-like member 14 by aligning the cam members 23 with the spaces or gaps between the cam members 22 carried by the bell-like member 14 whereby the cam members 23 are moved to a position inwardly of the cam members 22. With the sleeve 21 in this position, it is rotated whereby the arcuate cam shoulders extending helically between the bell-like member 14 and the sleeve 21 cause the sleeve 21 to move axially to thus force the sleeve 13 toward the shoulder 17. As the inner end 20 of the sleeve 13 moves to a position adjacent the shoulder 17, it engages the O-ring 19 to thus form a pressure tight seal between the end of the sleeve 13 and the shoulder 17. It will thus be seen that the end portion of the sleeve 13 which engages the O-ring 19 does not enter the O-ring but closes against it in a straight compression manner. Since the O-ring does not have to expand to receive a component moving therethrough, the O-ring is not compressed around the sleeve with a friction fit. Accordingly, the pipe sections can be rotated relative to each other after assembly.

After securing the pipe sections to each other, the locking member 24 is installed by inserting the U-shaped bracket over the outer edge of the bell-like member 14 which carries the recess 28. That is, the upper leg 26 of the locking member 24 snaps over the upper edge of the bell-like member while the lower leg 27 enters the recess 28 and engages the outer surface of the sleeve 21. By providing the serrations 29 and 31 along the lower surfaces of the legs 26 and 27 and the serrations 32 and 33 along the adjacent outer surfaces of the bell-like member and the sleeve 21, the sleeve 21 is held against rotation relative to the bell-like member 14 until the locking member 24 is removed.

In FIGS. 9–14, I show a modified form of my invention in which pipe sections $10^a$ and $11^a$ are connected to each other. A sleeve $13^a$ surrounds and is secured to the end of the pipe section $10^a$ by an adhesive $12^a$. In like manner, the pipe section $11^a$ is secured to the reduced diameter end portion of a bell-like member $14^a$ by the adhesive $12^a$.

Figure 9:
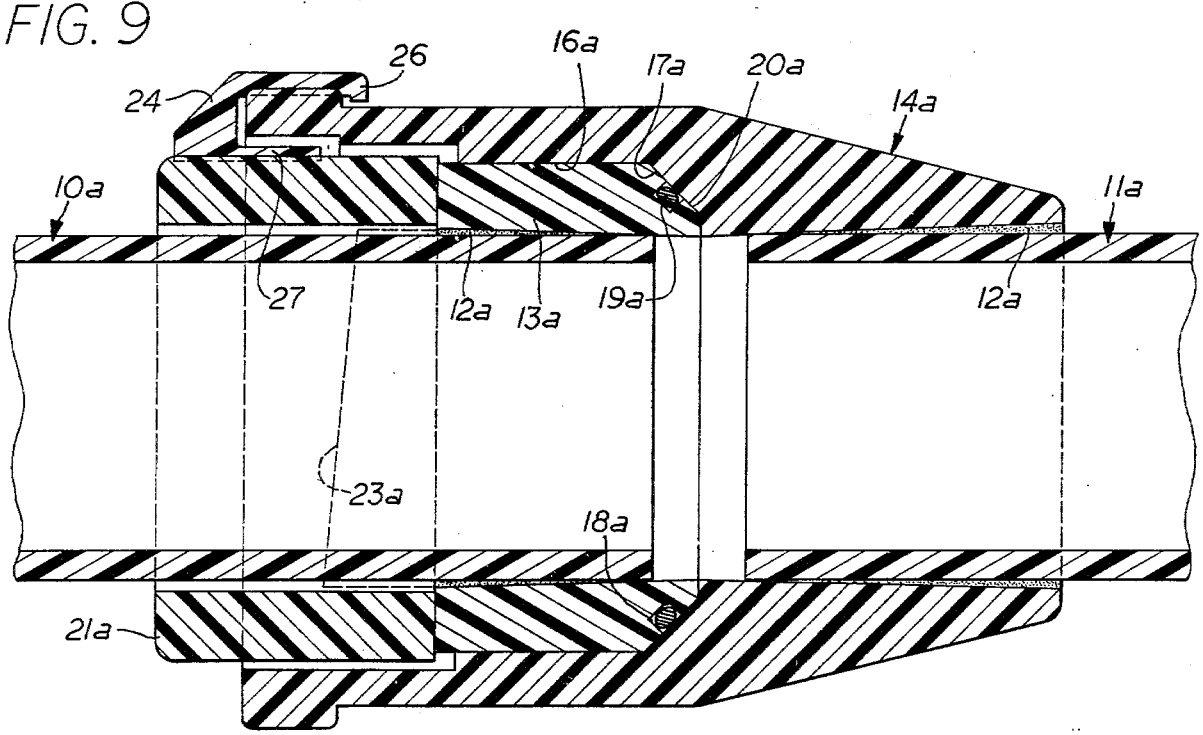
FIG. 9 is a longitudinal sectional view showing a modification.
Figure 10:
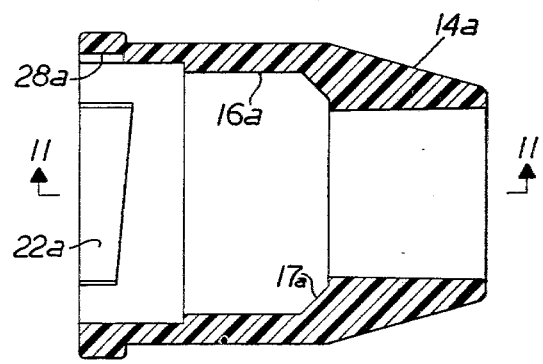
FIG. 10 is a sectional view corresponding to FIG. 9, drawn to a smaller scale, showing only the bell-like member.
Figure 11:
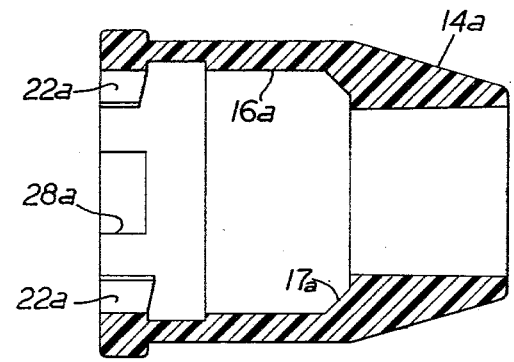
FIG. 11 is a sectional view taken generally along the line 11—11 of FIG. 10.
Figure 12:
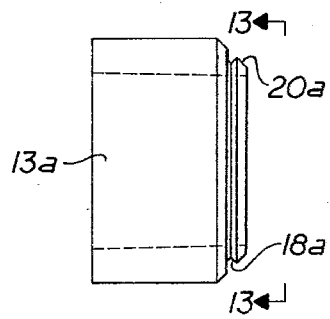
FIG. 12 is a side elevational view showing the sleeve which is secured to the end of one pipe section.
Figure 13:
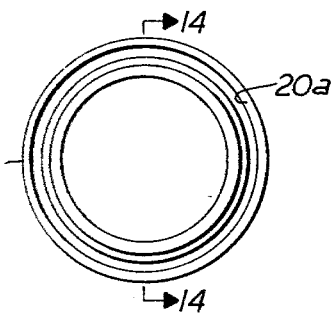
FIG. 13 is an end elevational view taken along the line 13—13 of FIG. 12.
Figure 14:
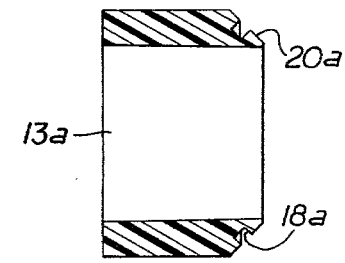
FIG. 14 is a sectional view taken along the line 14—14 of FIG. 13.

The bell-like member $14^a$ is provided with an enlarged diameter bore $16^a$ which terminates in an annular shoulder $17^a$ which tapers inwardly toward the inner end of the bore, as clearly shown in FIG. 9. The inner end of the sleeve $13^a$ also tapers inwardly toward the inner end of the bore $16^a$ whereby it is provided with a beveled end portion $20^a$ which has a taper corresponding to the tapered annular shoulder $17^a$ of the bore $16^a$. An internal annular groove $18^a$ is provided in the tapered portion $20^a$ at the inner end of the sleeve $13^a$ for receiving an O-ring $19^a$ which is engageable with the annular shoulder $17^a$ upon axial movement of the sleeve $13^a$ to a position adjacent the annular shoulder $17^a$, as clearly shown in FIG. 9.

A rotatable sleeve 21 surrounds the pipe section $10^a$ and is adapted for both rotative and axial movement relative to the pipe section $10^a$. Cam members $22^a$ are formed integrally with the inner surface of the bell-like member $14^a$ and project inwardly thereof in position to cooperate with outwardly projecting cam members $23^a$ carried by the sleeve $21^a$ to effect axial movement of the sleeve $21^a$ in response to rotative movement thereof. The cam members $22^a$ and $23^a$ are in the form of arcuate cam shoulders which extend helically between the bell-like member $14^a$ and the sleeve $21^a$ for approximately 90°. In view of the fact that the construction and operation of the cam members $22^a$ and $23^a$ is identical to the cam members 22 and 23 described hereinabove, no further description thereof is deemed necessary.

My improved locking member 24, described hereinabove, is adapted for use with the embodiment shown in FIGS. 9–14. That is, the legs 26 and 27 of the locking member 24 snap over the edge of the bell-like member $14^a$ with the upper leg 26 extending over the outer surface of the bell-like member $14^a$ while the lower leg 27 extends inwardly of a recess $28^a$ provided in the bell-like member $14^a$ to thus secure the sleeve $21^a$ against rotation relative to the bell-like member $14^a$, after installation.

The assembly and operation of my improved joint shown in FIGS. 9–14 is substantially identical to that of the embodiment shown in FIGS. 1-8. That is, the only difference being the provision of the tapered shoulder 20$^a$ at the inner end of the sleeve 13$^a$ which cooperates with a correspondingly tapered surface provided by the shoulder 17$^a$.

From the foregoing, it will be seen that I have devised an improved joint for connecting pipe sections to each other. By providing a joint which may be assembled or disassembled by merely rotating the components 90°, I provide a joint which is not only simple of construction and economical of manufacture but one which also saves a considerable amount of time in installation. Also, by providing sealing means between the annular shoulder in the bore of the bell-like member and the adjacent end of the sleeve which is bonded to the adjacent pipe section, I provide a pressure seal and at the same time provided a seal which is out of sliding contact with the axially moving components of the joint, thereby reducing wear and damage to the seal as the joint is assembled and also permitting the pipe sections to be rotated after assembly. Furthermore, by providing means for locking the bell-like member to the rotatable sleeve, after installation, the joint does not become loose by vibration or the like.

While I have shown my invention in two forms, it will be obvious to those skilled in the art that it is not so limited, but is susceptible of various changes and modifications without departing from the spirit thereof.

What I claim is:

1. A joint for connecting a first pipe section to a second pipe section comprising:
   (a) a first sleeve surrounding and bonded to the end of said first pipe section,
   (b) a bell-like member surrounding and bonded to the end of said second pipe section and having an enlarged diameter bore terminating in an annular shoulder at its inner end and being of a size to receive said first sleeve with the inner end of said first sleeve being movable axially to a position adjacent said annular shoulder,
   (c) a second sleeve surrounding said first pipe section adjacent said first sleeve and adapted for rotative and axial movement within said bell-like member to selected positions relative to said first pipe section,
   (d) cam means within said bell-like member projecting inwardly of said bell-like member and cooperable with outwardly projecting cam means carried by said second sleeve to effect axial movement of said second sleeve in response to rotative movement of said second sleeve,
   (e) annular sealing means interposed between said annular shoulder and said inner end of said first sleeve effecting a seal therebetween upon axial movement of said first sleeve to said position adjacent said annular shoulder,
   (f) a generally U-shaped locking bracket adapted for one leg thereof to snap over and engage a segment of the outer surface of said bell-like member with the other leg thereof extending between the inner surface of said bell-like member and a segment of the outer surface of said second sleeve,
   (g) longitudinally extending serrations in the under surfaces of said one leg and said other leg and in the adjacent outer surfaces of said bell-like member and said second sleeve, and
   (h) there being a recess in said inner surface of said bell-like member for receiving said other leg after assembly to define a locking member which detachably connects said bell-like member to said second sleeve and prevents relative movement therebetween.

* * * * *